3,051,647
HYDROGENATION OF GASOLINES
Peter Thomas White, Sunbury-on-Thames, England, assignor to The British Petroleum Company Limited, London, England, a British joint-stock corporation
No Drawing. Filed July 20, 1959, Ser. No. 828,068
Claims priority, application Great Britain July 25, 1958
11 Claims. (Cl. 208—255)

This invention relates to the controlled partial hydrogenation of gasolines containing unsaturated hydrocarbons which tend to form gum due to the presence of one or more compounds such as styrenes, cyclopentadiene or other conjugated dienes. One such gasoline is steam cracker gasoline, which is herein defined as a gasoline produced by cracking a straight-run petroleum distillate in the presence of steam.

It has been found that a catalyst prepared in a particular manner is particularly suitable for the controlled partial hydrogenation of gum-forming gasolines and accordingly the present invention consists in a process for treating gasolines containing unsaturated hydrocarbons which tend to form gum comprising contacting the gasoline together with hydrogen with an activated catalyst prepared initially by impregnating a support or support-forming material with a solution of a complex of ammonia or a suitable amine with a substantially water-insoluble nickel salt of an organic acid, under conditions such that the gasoline is partially hydrogenated and the gum-forming tendency reduced.

An example of a suitable organic acid is formic acid. A complex of the salt and ammonia or an amine may be formed by simply dissolving the salt in an aqueous solution of ammonia or an amine. The process is particularly suitable for treating steam-cracker gasolines.

The initially prepared impregnated support must be activated before use by reduction of the salt to the metal. This may conveniently be done in situ in the reactor. When using a nickel formate-ammonia complex this may be achieved in a single stage since nickel formate decomposes directly to the metal under non-oxidising conditions e.g. on heating in a stream of hydrogen or an inert gas stream. This direct decomposition to metal takes place at relatively low temperatures of the order of 250° C. With the preferred nickel formate-ammonia complex, the catalyst is preferably heated at 150–300° C. in a stream of hydrogen or an inert gas at atmospheric pressure.

Any convenient support may be used, preferably one which is inert with respect to the gasoline feedstock. Thus activated alumina may be used, but preferably the support is a group II metal carbonate such as calcium carbonate, sepiolite or any base which has a low activity for cracking reactions and a low activity for polymerisation reactions. Examples of such low-activity bases are calcium, barium, strontium, or magnesium oxide, diatomaceous earths, fire brick derived from diatomaceous earth, silicon carbide, quartz, carbon (for example charcoal and graphite), pumice and deactivated alumina. Preferably the nickel content of the catalyst, expressed as elemental nickel, is from 1 to 50% by weight of total catalyst, and more particularly 5 to 15% wt.

The hydrogenation of the steam cracker gasoline may conveniently be carried out under the following conditions:

Temperature—0 to 200° C. (preferably 80–180° C.)
Pressure—0 to 1000 p.s.i.g. (preferably 200–300 p.s.i.g.)
Gas rate (including make-up gas)—300 to 1000 s.c.f. hydrogen/b.
Space velocity—0.5–10 v./v./hr. preferably about 2 v./v./hr.

The hydrogenating gas which may be used on a once through basis or with recycle, may be pure hydrogen or a gas containing at least 25 mol percent hydrogen, preferably at least 50 mol percent hydrogen. As is well known in the art, severity of hydrogenation can be increased by raising the hydrogen partial pressure, raising the reaction temperature, increasing the hydrogen/feedstock ratio, or decreasing the flow rate. In general, the hydrogen consumption, which is a measure of the hydrogenation severity, will be at least 60 s.c.f./b., preferably at least 120 s.c.f./b., and it may be more than 150 s.c.f./b. the upper limit being fixed by the undesirability of substantially reducing the octane number of the gasoline by hydrogenation of mono-olefins. The research octane number (with 1.5 ml. TEL/IG) is preferably not less than the octane number of the similarly leaded gasoline feedstock. Leaded research octane numbers are preferred as a basis for comparison since while there may be some slight drop in research octane numbers (clear) as between feed and product, this is offset by an increased lead response on the product.

Suitable tests which give a measure of the gum stability of gasolines during storage or in an engine are the Induction Period test (ASTM method D525–55), the Accelerated Gum test (D873–49), and the Existent Gum test (ASTM method D381–57).

EXAMPLE 1

*Preparation of nickel formate-on-firebrick catalyst.*—41 g. nickel formate, $Ni(HCO_2)_2.2H_2O$, were dissolved in 120 ml. ammonia solution (SG. 880) and the resulting solution diluted to 200 ml. with distilled water, stirred for 10 min. and filtered. The solution was used to impregnate 400 ml. (124 g.) of 8–10 mesh firebrick which had previously been roasted for 2 hrs. at 550° C. All the solution was absorbed. The catalyst was then dried in a current of air at 100° C. for 1½ hrs. The nominal nickel content was 9.6% wt.

EXAMPLE 2

*Preparation of nickel formate-on-sepiolite catalyst.*— 200 ml. (87 g.) of sepiolite, crushed to 6–10 mesh and roasted for 2 hrs. at 550° C., were impregnated with a solution of 29 g. nickel formate, $Ni(HCO_2)_2.2H_2O$, in 80 ml. ammonia solution (SG. 880) and 20 ml. distilled water. All the solution was absorbed. The catalyst was dried in a current of air at 100° C. for 3 hrs. The nominal nickel content was 9.6% wt.

EXAMPLE 3

The catalysts prepared in Examples 1 and 2 were activated by heating in a stream of inert gas for 4 hours at 250° C. and atmospheric pressure and then tested for hydrogenation activity with a steam cracker gasoline feedstock. Inspection data on the gasoline feedstock are given in Table 1 below:

*Table 1*

| | |
|---|---:|
| Specific gravity at 60° F./60° F. | 0.7825 |
| ASTM distillation: | |
| IBP ° C. | 45.0 |
| 2% volume recovered at ° C. | 57.5 |
| 5% volume recovered at ° C. | 63.0 |
| 10% volume recovered at ° C. | 67.5 |
| 20% volume recovered at ° C. | 76.0 |
| 30% volume recovered at ° C. | 85.0 |
| 40% volume recovered at ° C. | 94.5 |
| 50% volume recovered at ° C. | 103.5 |
| 60% volume recovered at ° C. | 113.0 |
| 70% volume recovered at ° C. | 122.0 |
| 80% volume recovered at ° C. | 133.0 |
| 90% volume recovered at ° C. | 155.0 |
| FBP ° C. | 218 |
| Recovery percent vol. | 98.0 |
| Residue do. | 1.1 |

| | | |
|---|---|---|
| Loss | percent vol | 0.9 |
| Recovered at 70° C | do | 12.5 |
| Recovered at 100° C | do | 46.0 |
| Recovered at 140° C | do | 83.5 |
| Gum existent | mg./100 ml | 8 |
| Gum accelerated (120 min.) | mg./100 ml | 8 |
| Gum accelerated (240 min.) | mg./100 ml | 227 |
| Induction period ASTM | min | 290 |
| Induction period IP | min | 225 |
| Bromine number | | 65.8 |
| Sulphur | percent wt | 0.005 |
| Research octane number clear | | 93.8 |

The hydrogenation was carried out using pure hydrogen gas. Other process conditions and inspection data on the product are given in Table 2 below:

Table 2

| Catalyst | Nickel-on-Firebrick | Nickel-on-Sepiolite |
|---|---|---|
| Time on stream | hr | 3-6 | 3-6 |
| Temperature | °C | 100 | 100 |
| Pressure | p.s.i.g. | 200 | 200 |
| Space velocity | v./v./hr. | 2.02 | 2.04 |
| Hydrogen absorption | s.c.f./b. | 330 | 425 |
| Catalyst bulk density | g./ml. | 0.43 | 0.58 |
| Product Data: | | | |
| Gum Existent | mg./100 ml | 3 | 2 |
| Gum Accelerated (120 min) | mg./100 ml | 3 | 2 |
| Induction Period ASTM | min | >720 | >720 |
| Bromine Number | | 42.1 | |

EXAMPLE 4

Two similar catalysts were prepared by different techniques. The first (catalyst A) was prepared by the method of the present invention as follows:

Powdered sepiolite of 30-60 mesh grain size was calcined for 2 hours at 550° C. and mixed with 1 percent weight powdered graphite to give an even graphite distribution. The mixture was then pelleted to 1/8" x 1/8" cylinders. The sepiolite pellets were contacted with a solution of the complex $Ni(NH_3)_6(HCOO)_2$ such that the resultant nominal nickel content of the impregnated pellets was 10 percent weight. All the solution was absorbed by the sepiolite pellets which were then air dried at 100° C. The catalyst had a bulk density of 1.05 g./ml.

The second (catalyst B) was prepared by a dry milling technique as follows:

Powdered sepiolite of 30-60 mesh grain size was calcined for 2 hours at 550° C. The sepiolite and nickel formate, in proportions to give a nominal nickel content of 10 percent, were milled together for sufficient time to give an even mixture and 1 percent weight of powdered graphite was then added to the mixture. Distilled water was added to the mixture to give a paste; the material was then dried at 100° C., and crushed to particle size range 22-60 mesh. This material was pelleted to 1/8" x 1/8" cylinders. The catalyst had a bulk density of 1.05 g./ml.

These two catalysts, designated for convenience catalyst A and catalyst B respectively, were activated by heating for 2 hours at atmospheric pressure and 250° C. in a stream of hydrogen. The hydrogen flow rate was 100 v./v./hr. They were then tested for hydrogenation activity with a steam cracker gasoline feedstock, inspection data for which are given in Table 3 overleaf.

Table 3

| | | |
|---|---|---|
| Specific gravity at 60° F./60° F. | | 0.7800 |
| ASTM distillation test: | | |
| IBP | °C | 44.5 |
| 2% recovered at | °C | 53.5 |
| 5% recovered at | °C | 60.5 |
| 10% recovered at | °C | 66.5 |
| 20% recovered at | °C | 76.0 |
| 30% recovered at | °C | 85.0 |
| 40% recovered at | °C | 95.0 |
| 50% recovered at | °C | 105.0 |
| 60% recovered at | °C | 113.5 |
| 70% recovered at | °C | 122.5 |
| 80% recovered at | °C | 135.0 |
| 90% recovered at | °C | 158.5 |
| FBP | °C | 214.0 |
| Recovery | percent vol | 97.5 |
| Residue | do | 1.3 |
| Loss | do | 1.2 |
| Recovered at 70° C | do | 13.5 |
| Recovered at 100° C | do | 45.0 |
| Recovered at 140° C | do | 82.5 |
| Total sulphur | percent wt | 0.007 |
| Gum existent | mg./100 ml | [1] (22)4 |
| Gum accelerated (120 min.) | mg./100 ml | [1] (28)25 |
| Gum accelerated (240 min.) | mg./100 ml | [1] (137)113 |
| Induction period ASTM | min | 315 |
| Induction period IP | min | 235 |
| Bromine number | | 70.0 |

[1] Figures in parentheses indicate gum content before washing with n-heptane.

The process conditions were:

| | |
|---|---|
| Temperature | 100° C. |
| Pressure | 200 p.s.i.g. |
| Space velocity | 2 v./v./hr. |
| Gas flow rate (once-through hydrogen) | 32.1/hr. at STP (750 s.c.f./b.). |
| Test period | 6 hr. |

The hydrogen absorption, which is a measure of catalyst activity, was 210 s.c.f./b. for catalyst A and 84 s.c.f./b. for catalyst B, showing the superiority of the catalyst prepared according to the present invention.

I claim:

1. In a process for treating gasoline, containing unsaturated hydrocarbons, which tends to form gum, the improvement which comprises contacting the gasoline together with a gas comprising hydrogen with an activated catalyst, prepared initially by impregnating a support with a solution of a complex of ammonia with a substantially water-insoluble nickel salt of formic acid, the conditions of contact being such that the gasoline is partially hydrogenated and the gum-forming tendency reduced.

2. A process as claimed in claim 1 wherein the catalyst is activated by heating at 150-300° C. in a stream of hydrogen or an inert gas.

3. A process as claimed in claim 1, wherein the gasoline is a steam-cracker gasoline.

4. The method of claim 1 wherein the gasoline being treated is steam-cracker gasoline, the catalyst is elemental nickel on a support, and wherein the hydrogenation is carried out at a temperature of 0 to 200° C. and a pressure of 0 to 1000 p.s.i.g.

5. A process as claimed in claim 1, wherein the catalyst has a nickel content, expressed as elemental nickel, of from 1 to 50% by weight of total catalyst.

6. A process as claimed in claim 5 wherein the catalyst has a nickel content, expressed as elemental nickel, of from 5 to 15% by weight of total catalyst.

7. A process as claimed in claim 1, wherein the hydrogenation is carried out at 0-200° C. and 0-1000 p.s.i.g.

8. A process as claimed in claim 7 wherein the hydrogenation is carried out at 80-180° C. and 200-300 p.s.i.g.

9. A process as claimed in claim 7 wherein the gas rate is 300-1000 s.c.f. of hydrogen/b. and the space velocity is 0.5-10 v./v./hr.

10. A process as claimed in claim 1 wherein the research octane number (with 1.5 ml. TEL/IG) of the product is not less than the research octane number (with 1.5 ml. TEL/IG) of the feedstock.

11. A process as claimed in claim 1 wherein a support-forming material is impregnated with said solution.

(References on following page)

References Cited in the file of this patent

UNITED STATES PATENTS

| | | |
|---|---|---|
| 2,042,298 | Davis | May 26, 1936 |
| 2,073,578 | Gwynn | Mar. 9, 1937 |
| 2,116,061 | Dorrer | May 3, 1938 |
| 2,542,471 | Brandon | Feb. 20, 1951 |
| 2,638,438 | Hoffman et al. | May 12, 1953 |
| 2,640,009 | Montgomery et al. | May 23, 1953 |
| 2,735,879 | Redcay | Feb. 21, 1956 |
| 2,865,851 | Porter | Dec. 23, 1958 |
| 2,888,397 | Burton et al. | May 26, 1959 |
| 2,901,423 | Herbert et al. | Aug. 25, 1959 |
| 2,946,743 | Moy et al. | July 26, 1960 |

FOREIGN PATENTS

| | | |
|---|---|---|
| 543,022 | Canada | July 2, 1957 |

UNITED STATES PATENT OFFICE
CERTIFICATE OF CORRECTION

Patent No. 3,051,647                                                 August 28, 1962

Peter Thomas White

It is hereby certified that error appears in the above numbered patent requiring correction and that the said Letters Patent should read as corrected below.

Column 3, Table I, line 6 thereof, for "8" read -- 46 --.

Signed and sealed this 22nd day of January 1963.

(SEAL)
Attest:

ERNEST W. SWIDER                                      DAVID L. LADD
Attesting Officer                                      Commissioner of Patents